US008264715B2

(12) United States Patent
Nuggehalli (10) Patent No.: US 8,264,715 B2
(45) Date of Patent: *Sep. 11, 2012

(54) APPROACH FOR IMPLEMENTING LOCKED PRINTING WITH REMOTE UNLOCK ON PRINTING DEVICES

(75) Inventor: Jayasimha Nuggehalli, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 1433 days.

This patent is subject to a terminal disclaimer.

(21) Appl. No.: 11/411,248

(22) Filed: Apr. 25, 2006

(65) Prior Publication Data

US 2007/0247660 A1    Oct. 25, 2007

(51) Int. Cl.
*G06F 3/12*      (2006.01)
*G06F 15/16*     (2006.01)

(52) U.S. Cl. ............ 358/1.15; 358/1.13; 358/1.14; 358/1.16; 358/1.17; 358/1.9; 358/1.6; 358/401; 358/402; 358/408; 358/425; 358/426.01; 358/426.02; 358/426.03; 358/426.04; 358/426.08; 358/426.12; 358/426.13; 358/426.14; 358/426.15; 358/426.16; 358/435; 709/203; 709/206; 709/211; 709/216; 709/219; 709/223; 709/224; 709/225; 709/228; 709/229; 709/246; 400/3; 400/17; 400/70; 400/76; 718/102; 718/103; 718/104; 700/97; 700/100; 700/101; 700/108; 700/138; 705/7; 705/8; 705/30; 705/67

(58) Field of Classification Search ............... 358/1.15, 358/1.13, 1.14, 1.16, 1.17, 1.9, 1.6; 709/203, 709/206, 211, 216, 218, 219, 223, 224, 225, 709/228, 229; 400/3, 17, 70, 76

See application file for complete search history.

(56) References Cited

U.S. PATENT DOCUMENTS 5,633,932 A    5/1997   Davis et al.
5,845,066 A    12/1998  Fukuzumi
(Continued)

FOREIGN PATENT DOCUMENTS

EP       1 091 275       4/2001
(Continued)

OTHER PUBLICATIONS

European Patent Office, "European Search Report", European patent application EP 08 16 0705, dated Nov. 12, 2008, 10 pages.

(Continued)

*Primary Examiner* — Steven Kau
(74) *Attorney, Agent, or Firm* — Hickman Palermo Truong Becker Bingham Wong LLP; Edward A. Becker (57) ABSTRACT

An approach is provided for implementing locked printing on a printing device with remote unlock. The printing device includes a locked print process that is configured to examine print data received by the printing device and determine whether locked printing is to be used for the print data. Print data designated for locked printing is stored on the printing device. The printing device also includes a Web application configured to generate Web pages that define a Web-based graphical user interface. When processed at a client device, the Web pages allow a user to enter authorization data that is transmitted to the Web application on the printing device. The locked print process verifies the authorization data and if the authorization data is successfully verified, allows the user access to locked print data on the printing device. The approach may also be implemented using a common repository to store print data.

12 Claims, 7 Drawing Sheets

U.S. PATENT DOCUMENTS

| | | | | |
|---|---|---|---|---|
| 5,880,447 | A * | 3/1999 | Okada et al. | 235/380 |
| 6,735,665 | B1 | 5/2004 | Kumagai et al. | |
| 6,880,124 | B1 | 4/2005 | Moore | |
| 6,938,154 | B1 | 8/2005 | Berson et al. | |
| 6,965,449 | B2 | 11/2005 | Sugiyama | |
| 6,970,259 | B1 | 11/2005 | Lunt et al. | |
| 6,973,671 | B1 | 12/2005 | Hsing et al. | |
| 7,002,703 | B2 * | 2/2006 | Parry | 358/1.15 |
| 7,079,269 | B2 | 7/2006 | Teeuwen et al. | |
| 7,110,541 | B1 | 9/2006 | Lunt et al. | |
| 7,136,176 | B2 | 11/2006 | Sugiyama | |
| 7,170,623 | B2 | 1/2007 | Matoba et al. | |
| 7,224,477 | B2 | 5/2007 | Gassho et al. | |
| 7,359,076 | B2 | 4/2008 | Uchino | |
| 7,382,487 | B2 | 6/2008 | Ikegami | |
| 7,450,260 | B2 | 11/2008 | Takeda et al. | |
| 7,609,412 | B2 | 10/2009 | Maruyama | |
| 7,660,803 | B2 | 2/2010 | Jin | |
| 7,667,865 | B2 * | 2/2010 | Ciriza et al. | 358/1.15 |
| 7,697,760 | B2 | 4/2010 | Kwok et al. | |
| 2001/0029521 | A1 | 10/2001 | Matsuda et al. | |
| 2001/0038462 | A1 | 11/2001 | Teeuwen et al. | |
| 2002/0002503 | A1 | 1/2002 | Matsuoka | |
| 2002/0021902 | A1 | 2/2002 | Hosoda et al. | |
| 2002/0023143 | A1 * | 2/2002 | Stephenson et al. | 709/218 |
| 2002/0041394 | A1 | 4/2002 | Aoki | |
| 2002/0059322 | A1 | 5/2002 | Miyazaki et al. | |
| 2002/0097431 | A1 | 7/2002 | Ikegami | |
| 2002/0120855 | A1 | 8/2002 | Wiley et al. | |
| 2003/0044009 | A1 | 3/2003 | Dathathraya | |
| 2003/0065404 | A1 | 4/2003 | Bhatti | |
| 2003/0090696 | A1 | 5/2003 | Willis et al. | |
| 2003/0090697 | A1 | 5/2003 | Lester et al. | |
| 2004/0019671 | A1 | 1/2004 | Metz | |
| 2004/0056889 | A1 | 3/2004 | Katano | |
| 2004/0088378 | A1 * | 5/2004 | Moats | 709/219 |
| 2004/0090652 | A1 | 5/2004 | Yoon | |
| 2004/0095595 | A1 | 5/2004 | Jacobsen | |
| 2004/0117389 | A1 | 6/2004 | Enami et al. | |
| 2004/0118911 | A1 | 6/2004 | Black et al. | |
| 2004/0125402 | A1 | 7/2004 | Kanai et al. | |
| 2004/0140611 | A1 | 7/2004 | Mui et al. | |
| 2004/0165216 | A1 | 8/2004 | Nauta | |
| 2004/0169884 | A1 | 9/2004 | Yamada et al. | |
| 2004/0196492 | A1 | 10/2004 | Johnson et al. | |
| 2004/0239992 | A1 | 12/2004 | Kawai et al. | |
| 2004/0257601 | A1 | 12/2004 | Tomiyasu et al. | |
| 2004/0257613 | A1 | 12/2004 | Okabe et al. | |
| 2004/0263870 | A1 | 12/2004 | Itoh et al. | |
| 2005/0039044 | A1 | 2/2005 | Gassho et al. | |
| 2005/0046876 | A1 | 3/2005 | Burget et al. | |
| 2005/0068547 | A1 | 3/2005 | Negishi et al. | |
| 2005/0094195 | A1 * | 5/2005 | Sakamoto et al. | 358/1.15 |
| 2005/0100378 | A1 | 5/2005 | Kimura et al. | |
| 2005/0141013 | A1 | 6/2005 | Kikuchi et al. | |
| 2005/0149744 | A1 | 7/2005 | Sydir et al. | |
| 2005/0152543 | A1 | 7/2005 | Shima et al. | |
| 2005/0154884 | A1 | 7/2005 | Van Den Tillaart | |
| 2005/0168769 | A1 | 8/2005 | Kim et al. | |
| 2005/0182508 | A1 | 8/2005 | Niimi et al. | |
| 2005/0182822 | A1 | 8/2005 | Daniel et al. | |
| 2005/0183141 | A1 | 8/2005 | Sawada | |
| 2005/0210253 | A1 | 9/2005 | Shigeeda | |
| 2005/0213136 | A1 | 9/2005 | Noyama et al. | |
| 2005/0229189 | A1 | 10/2005 | McManus | |
| 2005/0254086 | A1 | 11/2005 | Shouno | |
| 2005/0268089 | A1 | 12/2005 | Kim et al. | |
| 2005/0273843 | A1 | 12/2005 | Shigeeda | |
| 2005/0273852 | A1 | 12/2005 | Ferlitsch | |
| 2005/0276618 | A1 | 12/2005 | Clement et al. | |
| 2006/0017954 | A1 | 1/2006 | Ly et al. | |
| 2006/0044589 | A1 | 3/2006 | Nakagawaji | |
| 2006/0112021 | A1 | 5/2006 | Maki | |
| 2006/0112270 | A1 | 5/2006 | Erez | |
| 2006/0268315 | A1 | 11/2006 | Randt | |
| 2006/0279760 | A1 | 12/2006 | Wang et al. | |
| 2006/0279761 | A1 | 12/2006 | Wang et al. | |
| 2006/0279768 | A1 | 12/2006 | Wang et al. | |
| 2006/0285141 | A1 | 12/2006 | Kim et al. | |
| 2007/0019224 | A1 | 1/2007 | Okada et al. | |
| 2007/0091360 | A1 | 4/2007 | Iizuka | |
| 2007/0139695 | A1 | 6/2007 | Young et al. | |
| 2007/0146768 | A1 | 6/2007 | Isoda | |
| 2007/0177920 | A1 | 8/2007 | Katano et al. | |
| 2008/0037052 | A1 | 2/2008 | Nishiguchi | |
| 2008/0066185 | A1 | 3/2008 | Lester et al. | |
| 2008/0114922 | A1 | 5/2008 | Chou et al. | |
| 2008/0189598 | A1 | 8/2008 | Yoshida | |
| 2008/0201784 | A1 | 8/2008 | Someshwar | |
| 2009/0147698 | A1 | 6/2009 | Potvin | |
| 2009/0185223 | A1 | 7/2009 | Kanai et al. | |
| 2009/0244594 | A1 | 10/2009 | Nuggehalli | |
| 2009/0244595 | A1 | 10/2009 | Kim | |
| 2009/0244596 | A1 | 10/2009 | Katano | |
| 2009/0316183 | A1 | 12/2009 | Wei | |
| 2010/0002248 | A1 | 1/2010 | Nuggehalli et al. | |
| 2010/0002249 | A1 | 1/2010 | Nuggehalli et al. | |
| 2010/0253968 | A1 | 10/2010 | Nuggehalli | |
| 2010/0265529 | A1 | 10/2010 | Katano | |
| 2011/0013219 | A1 | 1/2011 | Nuggehalli et al. | |
| 2012/0002234 | A1 | 1/2012 | Wang | |
| 2012/0127504 | A1 | 5/2012 | Nuggehalli et al. | |

FOREIGN PATENT DOCUMENTS

| | | | |
|---|---|---|---|
| EP | 1 143 695 | | 10/2001 |
| EP | 1 229 724 | | 8/2002 |
| EP | 1 229 724 | A2 | 8/2002 |
| EP | 1229724 | A2 | 8/2002 |
| EP | 1 367 814 | | 12/2003 |
| EP | 1 465 052 | A2 | 10/2004 |
| EP | 1 511 287 | | 3/2005 |
| EP | 1 621 994 | | 2/2006 |
| EP | 1621994 | A1 | 2/2006 |
| JP | 4235667 | A | 8/1992 |
| JP | H06-095464 | | 8/1994 |
| JP | 10207660 | A | 8/1998 |
| JP | 2002175241 | A | 6/2002 |
| JP | 2004287824 | | 10/2004 |
| JP | 2005074772 | A | 3/2005 |
| JP | 2005092731 | | 4/2005 |
| JP | 2008-97115 | | 4/2008 |
| WO | WO 00/68817 | | 11/2000 |

OTHER PUBLICATIONS

European Patent Office, "European Search Report", application No. EP 09156641, dated Jul. 2, 2009, 8 pages.

European Patent Office, "European Search Report", application No. EP 09 15 6660, dated Jul. 6, 2009, 7 pages.

Claims, European patent application 07250426.9-1245, 3 pages.

European Patent Office, "Partial European Search Report", European patent application 07250426.9-1245, received Mar. 10, 2008, 5 pages.

Claims, European patent application 07250426.9-1245, 2 pages.

European Patent Office, "European Search Report", European patent application 07250426.9-1245, dated Jun. 12, 2008, 19 pages.

European Patent Office, "European Search Report", EP application No. EP 07252112, dated Mar. 1, 2010, 6 pages.

U.S. Appl. No. 12/166,741, filed Jul. 2, 2008, Office Action, Mailing Date May 26, 2011.

U.S. Appl. No. 11/148,864, filed Jun. 8, 2005, Notice of Allowance, Mailing Date May 27, 2011.

U.S. Appl. No. 11/149,065, filed Jun. 8, 2005, Notice of Allowance, Mailing Date May 26, 2011.

U.S. Appl. No. 11/788,517, filed Apr. 20, 2007, Notice of Allowance, Mailing Date, Jun. 21, 2011.

U.S. Appl. No. 11/880,359, filed Jul. 20, 2007, Restriction Requirement, Mailing Date Jul. 1, 2011.

U.S. Appl. No. 12/059,836, filed Mar. 31, 2008, Final Office Action, Mailing Date Jul. 7, 2011.

U.S. Appl. No. 11/656,592, filed Jan. 22, 2007, Office Action, Mailing Date Jul. 21, 2011.

U.S. Appl. No. 12/423,933, filed Apr. 15, 2009, Office Action, Mailing Date Dec. 8, 2011.
U.S. Appl. No. 12/417,846, filed Apr. 3, 2009, Office Action, Mailing Date Jan. 11, 2012.

U.S. Appl. No. 13/396,401, filed Feb. 14, 2012, Office Action, mailed May 7, 2012.

* cited by examiner

APPROACH FOR IMPLEMENTING LOCKED PRINTING WITH REMOTE UNLOCK ON PRINTING DEVICES

FIELD OF THE INVENTION

This invention relates generally to locked printing on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Some printing devices are configured with a feature known as "locked printing" to provide control over the printing of electronic documents. When the locked printing feature is enabled and print data is sent to the printing device, processing of the print data is deferred until a user enters authentication data at the printing device and the authentication data is verified. The authentication data typically includes a user ID and/or password, although many different types of authentication data may be used. A user enters the authentication data through an operation panel on the printing device and the printing device verifies the authentication data. Once the authentication data is successfully verified, the printing device allows the print data to be processed, i.e., allows a printed version of the electronic document reflected in the print data to be generated.

One of the problems with conventional locked printing approaches is that a user must enter the authentication data using the user interface provided on the printing device. User interfaces on printing devices often consist of a simple operation panel with a limited number of status indicators and function buttons. For example, a typical operation panel may include status lights that indicate whether a printing device is in a "ready" state, requires attention or is in an error state. The typical operation panel may also include buttons for resetting a print job, canceling a print job, turning the printing device online or offline and a "go" button for overriding a warning or error condition. An operation panel may also include a menu button and one or more "select" buttons that allow a user to view and navigate through a series of menu options. For example, the select buttons may include "+" and "−" or "<" and ">" buttons for menu navigation. Printing devices conventionally do not include full or even partial keyboards for entering characters and numbers, which makes entering authentication data in the form of an alphanumeric string tedious and time consuming. Some printing devices include a numeric keypad for entering a number of copies. Entering characters is tedious using a keypad because each number key must be associated with multiple characters and therefore entering a character string using a numeric keypad can require a large number of button presses. This process is further complicated in situations where the authentication data is in the form of case sensitive alphanumeric strings. Thus, entering authentication data, such as a user ID and password, using the user interface conventionally available on printing devices is tedious and not user friendly. Based on the foregoing, there is a need for an approach for implementing locked printing on printing devices that does not suffer from limitations of prior approaches.

SUMMARY

An approach is provided for implementing locked printing on a printing device with remote unlock. The printing device includes a locked print process that is configured to examine print data received by the printing device and determine whether locked printing is to be used for the print data. Print data designated for locked printing is stored on the printing device. The printing device also includes a Web application configured to generate Web pages that define a Web-based graphical user interface. The Web application is also configured to provide the Web pages to a client device. When processed at a client device, the Web pages allow a user to enter authorization data that is transmitted to the Web application on the printing device. The locked print process verifies the authorization data and if the authorization data is successfully verified, allows the user access to locked print data on the printing device. This may include, for example, allowing the user to cause the print data to be processed and a printed version of an electronic document reflected in the print data to be generated, or for the print data to be deleted. The approach allows users to use the user interface provided on client devices to enter authorization data for locked print, instead of, or in addition to, a user interface provided at the printing device. This is particularly convenient with client devices that have user interfaces that are better suited for entering authorization data in the form of alphanumeric strings. Furthermore, users do not have to be physically present at a printing device to allow locked print data to be processed. Users can allow print data to be processed from any location using their mobile and wireless devices. Other embodiments include implementing locked printing with remote unlock using a common repository to store print data.

According to one aspect of the invention, a printing device comprises a Web application and a locked print process. The Web application is configured to generate one or more Web pages and cause the one or more Web pages to be transmitted to a Web browser executing on a client device. The processing of the one or more Web pages by the Web browser at the client device causes a graphical user interface to be generated that allows a user to enter authorization data. The Web application is further configured to receive the authorization data from the Web browser executing on the client device. The locked print process is configured to examine print data received by the printing device to determine whether locked printing has been indicated for the print data. If locked printing has been indicated for the print data, then the print data is stored instead of being printed. The locked print process is further configured to verify the authorization data received from the client device and if the authorization data is successfully verified, allow the user access to the stored print data.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. LOCKED PRINTING ARCHITECTURE
III. LOCKED PRINTING WITH REMOTE UNLOCK
IV. LOCKED PRINTING WITH REMOTE UNLOCK USING COMMON REPOSITORY
V. IMPLEMENTATION MECHANISMS

I. Overview

An approach is provided for implementing locked printing on a printing device with remote unlock. The printing device includes a locked print process that is configured to examine print data received by the printing device and determine whether locked printing is to be used for the print data. Print data designated for locked printing is stored on the printing device. The printing device also includes a Web application configured to generate Web pages that define a Web-based graphical user interface. The Web application is also configured to provide the Web pages to a client device. When processed at a client device, the Web pages allow a user to enter authorization data that is transmitted to the Web application on the printing device. The locked print process verifies the authorization data and if the authorization data is successfully verified, allows the user access to locked print data on the printing device. This may include, for example, allowing the user to cause the print data to be processed and a printed version of an electronic document reflected in the print data to be generated, or for the print data to be deleted. The approach allows users to use the user interface provided on client devices to enter authorization data for locked print, instead of, or in addition to, a user interface provided at the printing device. This is particularly convenient with client devices that have user interfaces that are better suited for entering authorization data in the form of alphanumeric strings. Furthermore, users do have to be physically present at a printing device to allow locked print data to be processed. Users can allow print data to be processed from any location using their mobile and wireless devices. Other embodiments include implementing locked printing with remote unlock using a common repository to store print data.

II. Locked Printing Architecture

Figure 1:
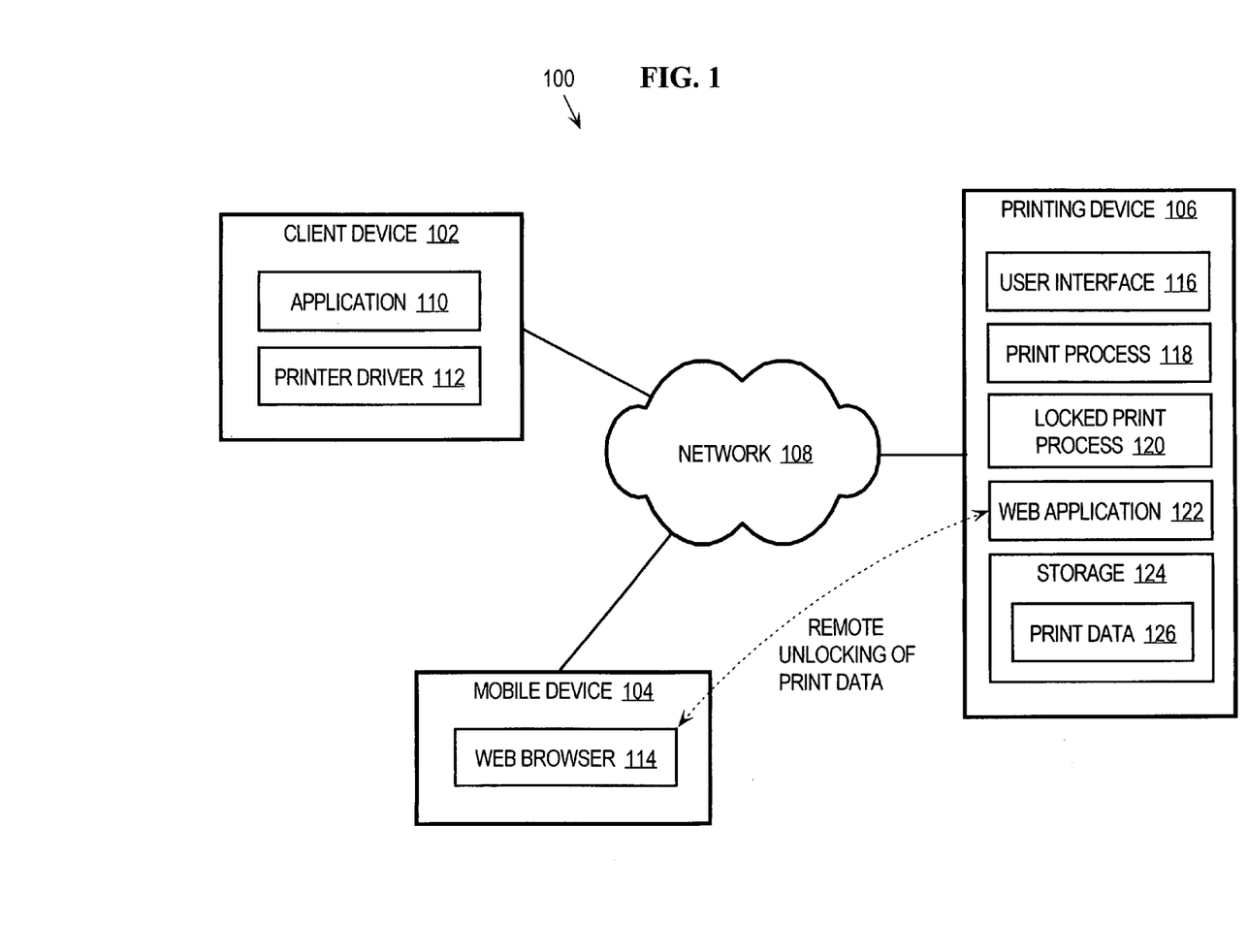
FIG. 1 is a block diagram that depicts an arrangement for implementing locked printing with remote unlock on a printing device according to an embodiment of the invention.

FIG. 1 is a block diagram that depicts an arrangement 100 for implementing locked printing on a printing device with remote unlock according to an embodiment of the invention. Arrangement 100 includes a client device 102, a client device 104 and a printing device 106, communicatively coupled via a network 108.

Client device 102 and client device 104 may be implemented by any type of client devices. Example implementations of client device 102 and client device 104 include, without limitation, workstations, personal computers, laptop computers, personal digital assistants (PDAs), cellular telephony devices and any type of mobile devices. In the example arrangement depicted in FIG. 1, client device 102 is configured with an application 110 and a printer driver 112. Application 110 may be any type of application process. Examples of application 110 include, without limitation, a word processor, a spreadsheet program and an email client. Printer driver 112 is configured to provide a user interface for a user to specify that locked printing is to be used to print particular print data. Printer driver 112 is also configured to process data from application 110 and generate print data that is provided to printing device 106 for processing. Thus, application 110 and printer driver 112 operate together to generate and provide print data to printing device 106. Client device 104 is configured with a Web browser 114 to allow a user to specify authorization data to remotely unlock print data, as described in more detail hereinafter. Client device 102 and client device 104 may be configured with other mechanisms, processes and functionality, depending upon a particular implementation. Furthermore, although the remote unlocking of locked print data is depicted in the figures and described herein in the context of using Web browser 114 executing on client device 104, the invention is not limited to is context and the remote unlocking of locked print data may be performed using a Web browser executing on client device 102 or any other device.

Printing device 106 may be implemented by any type of device that is capable of processing print data received from client device 102 and generate printed versions of electronic documents reflected in the print data. In example arrangement 100, printing device 106 includes a user interface 116, a print process 118, a locked print process 120, a Web application 122 and storage 124. Printing device 106 may be configured with other mechanisms, processes and functionality, depending upon a particular implementation, and the approach described herein for configuring locked printing on a printing device is not limited to any type of printing device 106. For example, printing device 106 may be a multi-function peripheral (MFP) that includes any combination of printing, copying, facsimile and scanning capability, etc.

User interface 116 may be any mechanism and/or medium that provides for the exchange of information between a user and printing device 106. Examples of user interface 116 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 106 may be configured to display information on user interface 116 in any number of languages, depending upon a particular implementation. As with conventional printing devices, the user interface 116 on printing device 106 may provide limited capability to easily enter alphanumeric strings.

Print process 118 may be implemented by one or more processes for processing print data received from client device 102 and for generating a printed version of an electronic document reflected in the print data. Locked print process 120 is one or more processes configured to provide locked print services and to verify authentication data, as described in more detail hereinafter. Print process 118 and locked print process 120 may be implemented as resident processes on printing device 106. Alternatively, print process 118 and locked print process 120 may be made available to printing device 106 on a removable media or may be implemented at a remote location with respect to printing device 106.

Web application 122 may be implemented by any mechanism or process for generating Web pages. The Web pages may be any type of Web pages, for example HTML, and may include any type of content, depending upon a particular implementation. One example of Web application 122 is a Web server.

Storage 124 may be implemented by any type of storage, including volatile and non-volatile storage. Examples of storage 124 include, without limitation, random access memory (RAM) and one or more disks.

User interface 116, print process 118, locked print process 120, Web application 122 and storage 124 may be implemented in hardware, software, or any combination of hardware or software, depending upon a particular implementation.

Network 108 may be implemented with any type of medium and/or mechanism that facilitates the wireless exchange of information between client device 102, printing device 106 and client device 104. Furthermore, network 108 may use any type of communications protocol and may be secured or unsecured, depending upon the requirements of a particular application.

III. Locked Printing with Remote Unlock

The approach described here for implementing locked printing on a printing device with remote unlock allows a user to specify authentication data using a Web-based user interface on a client device. The authentication data is then transmitted from the client device to the printing device for verification. If the authentication data is successfully verified, then the user is given access to locked print data stored on the printing device. The remote unlock functionality may be implemented in conjunction with unlock functionality provided directly through the user interface of a printing device.

Figure 2:
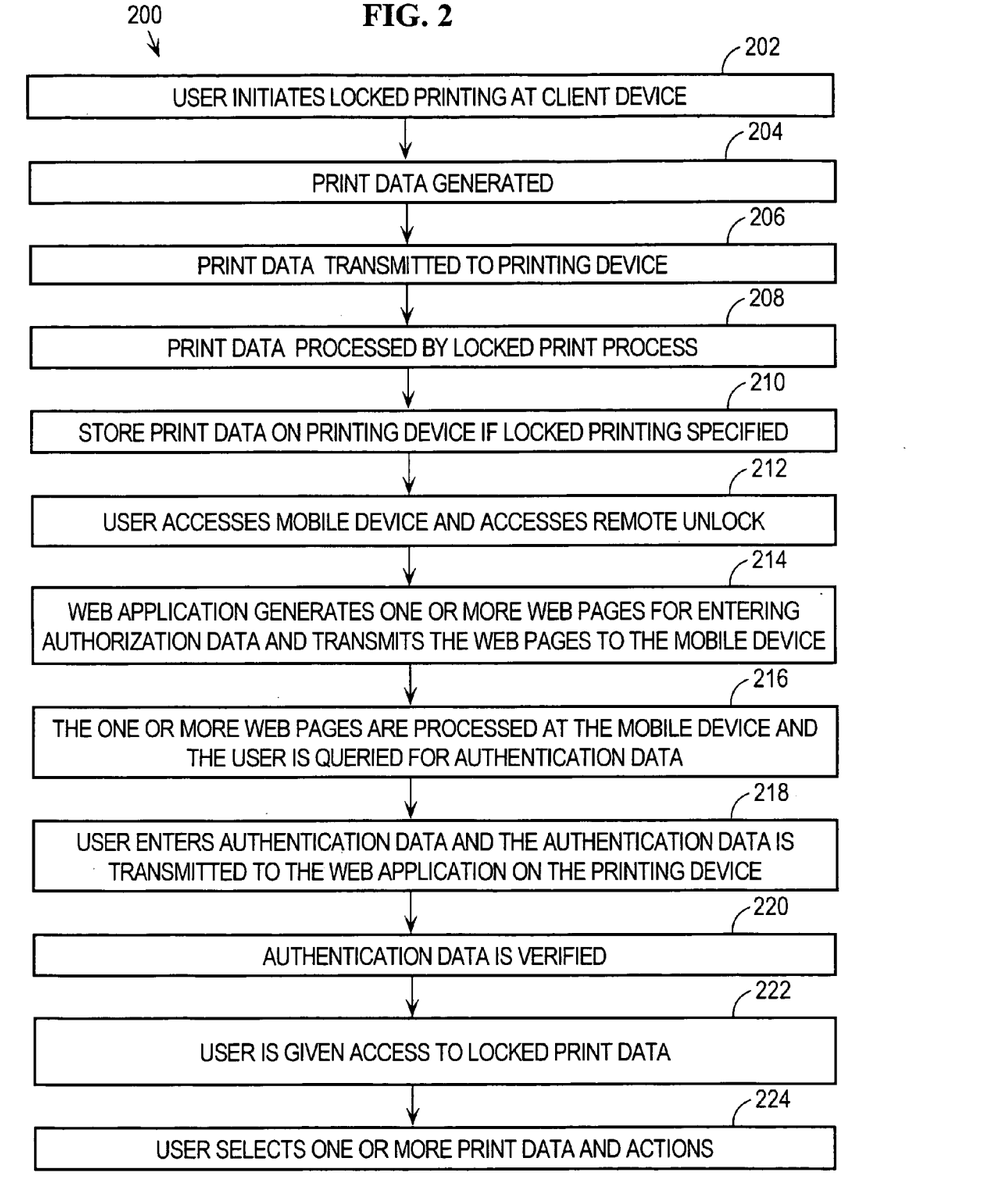
FIG. 2 is a flow diagram depicting an approach for implementing locked printing with remote unlock on a printing device, according to an embodiment of the invention.
Figure 3:
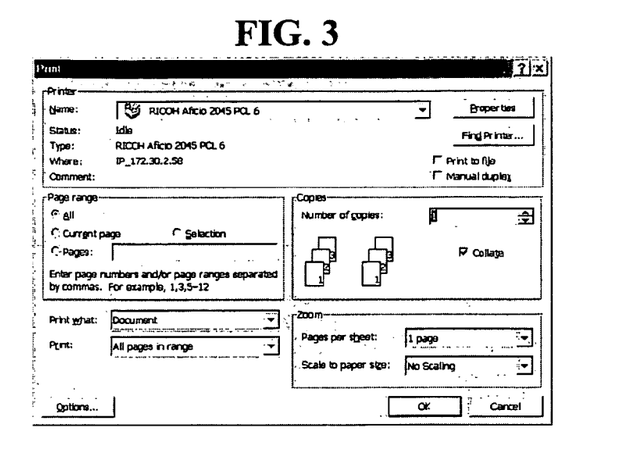
FIG. 3 depicts an example user interface generated by printer driver after the user has selected a print option from application.
Figure 4:
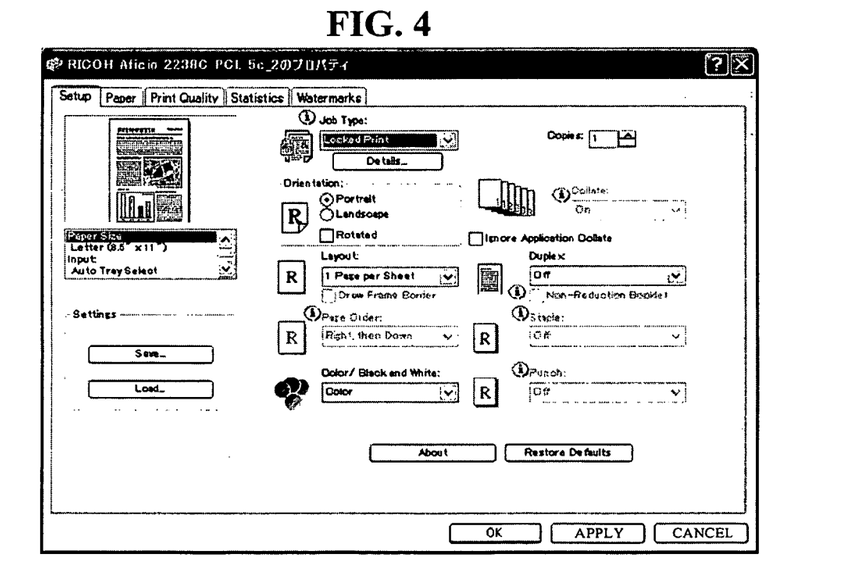
FIG. 4 depicts a printer properties configuration screen that is displayed in response to a user selecting the "properties" button in FIG. 3
Figure 5:
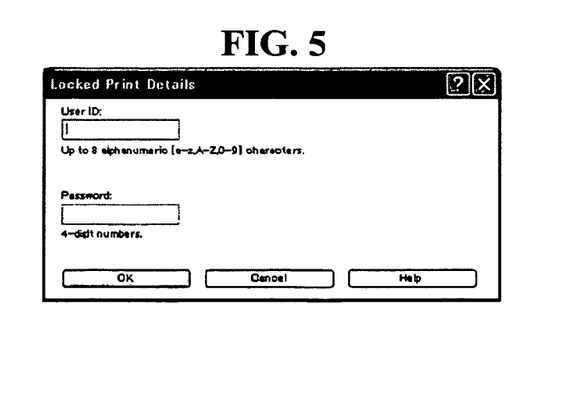
FIG. 5 depicts a locked printing details screen that allows a user to enter a user identification (ID) and password data in the form of a password.

FIG. 2 is a flow diagram 200 that depicts an approach for implementing locked printing on a printing device using remote unlock, according to one embodiment of the invention. In step 202, locked printing is initiated by a user at a client device. For example, a user of client device 102 initiates locked printing from application 110. FIG. 3 depicts an example user interface generated by printer driver 112 after the user has selected a print option from application 110. FIG. 4 depicts a printer properties configuration screen that is displayed in response to a user selecting the "properties" button in FIG. 3. The printer properties configuration screen allows a user to select locked printing and to specify details of the locked printing via a "details" button. FIG. 5 depicts an example locked printing details screen that allows a user to enter a user identification (ID) and password data in the form of a password.

In step 204, print data is generated by printer driver 112. If the user has selected locked printing, then the print data includes data to indicate this. For example, the print data may include one or more Print Job Language (PJL) or Page Descriptor Language (PDL) commands that specify locked printing is to be used.

In step 206, the print data is transmitted to printing device 106 over network 108. To cause the print data to be processed by locked print process 120, the print data may be transmitted to a particular port. For example, the printing data may be transmitted to a particular Transport Control Protocol (TCP) port, such as port 9100 or 515 as two possible examples, to cause locked print process 120 to receive and process the print data.

In step 208, the print data is processed by locked print process 120. According to one embodiment of the invention, locked print process 120 examines the print data to determine whether locked printing has been specified. This may be determined, for example, by the presence of one or more commands in the print data that indicate that locked printing has been specified. If locked printing has been specified, then in step 210, locked print process 120 causes the print data to be stored as print data 126 on storage 124 of printing device 106. If locked printing has not been specified in the print data, then the print data may be provided to print process 118 for immediate processing. According to one embodiment of the invention, if locked printing has not been specified for print data, then the print data is deleted and not processed at printing device 106. This process may be repeated for any number of print data, from any number of client devices. Each print data that is received and determined to have locked printing specified is stored onto storage 124. Print data stored on storage 124 may be compressed and/or encrypted to save space and to provide additional security.

At some point in time, a user wishes to process print data that was sent to printing device 106 using locked printing and is therefore stored on printing device 106. According to one embodiment of the invention, in step 212, the user uses mobile device 104 to access a remote unlock feature implemented on printing device 106 to allow the user to remotely unlock print data on printing device 106. For example, the user may enter a URL into Web browser 114, which generates and transmits a request to Web application 122 for one or more Web pages related to remote unlock of print data. The request may be a conventional HTTP request for a Web page. In step 214, the Web application 122 generates one or more Web pages for entering authorization data and transmits the one or more Web pages to Web browser 114. Although embodiments of the invention are depicted in the figures and described herein in the context of using a Web browser 114 on mobile device 104, the invention is not limited to this context, and any type of application may be used that is configured to issue HTTP requests.

In step 216, the one or more Web pages are processed by Web browser 114 and the user is queried for authentication data. The one or more Web pages may be used to generate any type of graphical user interface, depending upon a particular implementation, and the invention is not limited to any particular type of Web pages or graphical user interface. For example, the one or more Web pages may present the user with a conventional login page. The authentication data may include any type of data and the invention is not limited to any particular type or format of authentication data. One example of authentication data is a user ID/password pair. The user's authentication data may be stored on mobile device 104 and the input fields automatically populated with the authentication data whenever the user subsequently accesses the remote unlock feature from the mobile device 104. This reduces the amount of work that the user has to do to enter the authentication data. Alternatively, for a higher level of security, part of the authentication data, such as a user ID may be automatically provided in a form. The user then only has to enter the other part of the authentication data, such as a password.

In step 218, the user enters authentication data via the graphical user interface generated by Web browser 114 and the authentication data is transmitted to the Web application 122 for authentication. The authentication data may be transmitted to the Web application using any mechanism for transferring data from a Web browser to a Web application. For example, HTML forms may be used with GET or POST commands. Web application 122 receives and provides the authentication data to locked print process 120. Alternatively, Web application 122 may provide the authentication data to another process on printing device 106.

In step 220, the authentication data is verified. The authentication data may be verified locally on printing device 106, or may be verified remotely at another location. For example, locked print process 120 may be configured to verify the authentication data received from mobile device 104 based upon data stored locally on storage 124. This may include, for example, comparing a user ID and password pair specified in the authentication data to a list of verified user ID/password pairs. As another example, a one-way hash function may be used to generate a result based upon the user ID/password pair specified in the authentication data. The result may then be compared to a list of verified results. These are just two examples of how verification of the authentication data may be performed and the invention is not limited to any particular verification mechanism or approach. Instead of verifying the authentication data locally, the authentication data may be verified remotely with respect to printing device 106. For example, locked print process 120 may cause the authentication data to be transmitted to another location, e.g., a verification server over network 108, and verified at the other location. Locked print process 120 then would receive a return indication from the other location indicating whether the authentication data was verified.

In step 222, the user is given access to locked print data on printing device 106. According to one embodiment of the invention, Web application 122 generates and transmits one or more additional Web pages to Web browser 114. When processed by Web browser 114, the one or more additional Web pages provide a graphical user interface that indicates print data that the user is authorized to access. For example, the graphical user interface generated by processing the one or more additional Web pages may include a list of all print data that the user is authorized to access. The graphical user interface may include user interface objects associated with groups of print data, such as all print data and new or recent print data. This allows a user to select groups of print data by selecting a single user interface-object associated with a group, instead of having to select individual print data. Print data may also be arranged on the graphical user interface, for example, sorted by name. The graphical user interface may also include one or more user interface objects that allow a user to select one or more print data to be processed at printing device 106 and one or more actions to be performed on those print data. For example, a user may select a user interface object associated with particular print data and then select a user interface object associated with a printing or deleting function to cause the particular print data to be processed accordingly. Users may be given different types of access to locked print data, depending upon a particular implementation. For example, users may be given access to only the print data that they generated. As another example, users may be given access to all locked print data associated with a logical group, such as a department, project, team, etc. As yet another example, an administrative user may be given access to all locked print data on a printing device so that the administrative user can properly manage the printing device. Access may be based upon the authentication data or other data stored on printing device 106.

In step 224, the user selects one or more print data to be processed and one or more actions to be performed on the print data. Printing device 106 processes the selected print data as indicated by the user.

IV. Locked Printing with Remote Unlock Using Common Repository

Figure 6:
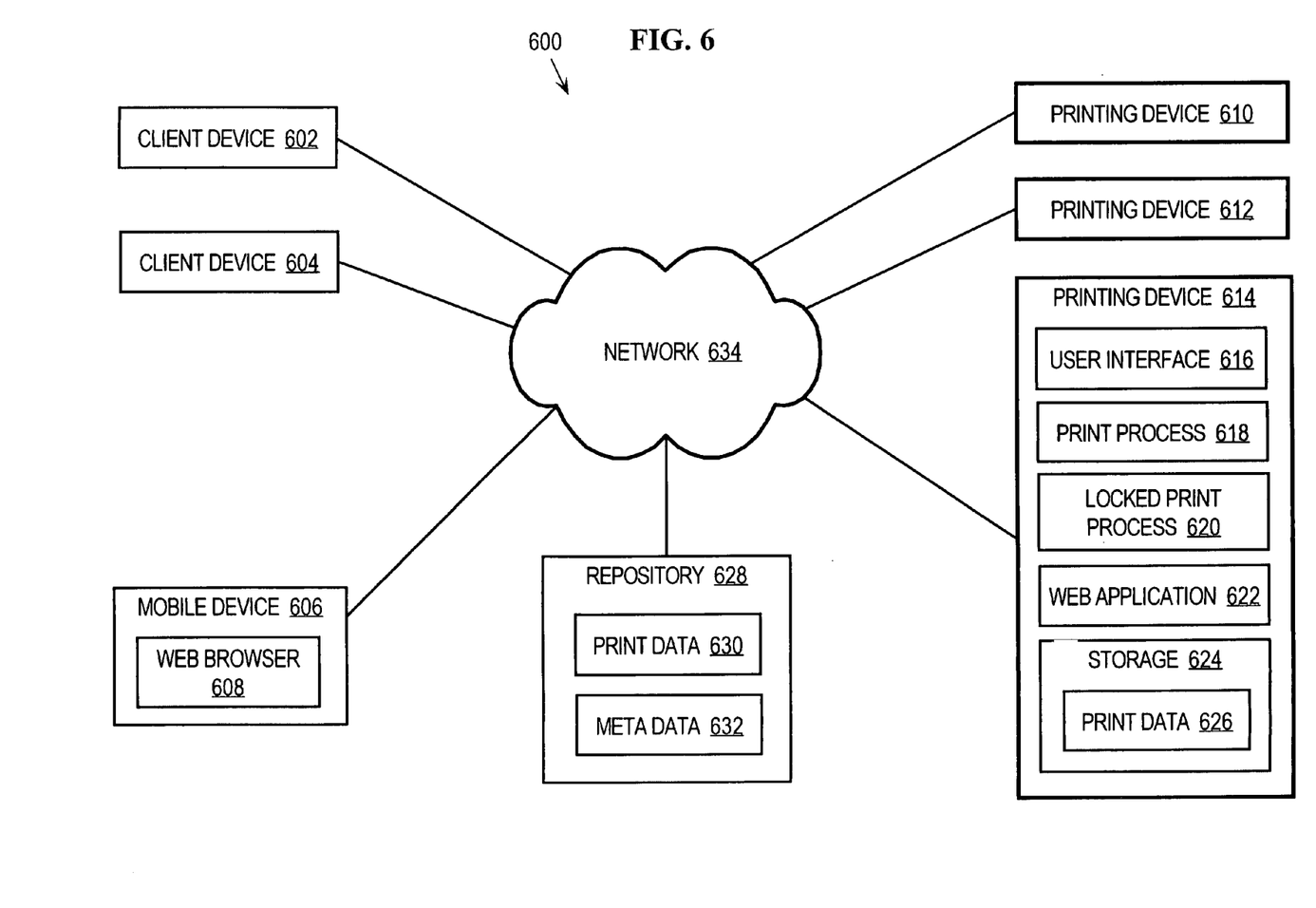
FIG. 6 is a block diagram that depicts an arrangement for implementing locked printing with remote unlock with a common repository according to an embodiment of the invention.

According to one embodiment of the invention, the approach for locked printing with remote unlock is implemented using a common repository. FIG. 6 is a block diagram of an arrangement 600 for implementing locked printing with remote unlock using common a repository, according to one embodiment of the invention. Arrangement 600 includes client devices 602, 604, a mobile device 606 with a Web browser 608, printing devices 610, 612 and 614, where printing device 614 includes a user interface 616, a print process 618, a locked print process 620, a Web application 622 and storage 624 with print data 626. Printing devices 610, 612 may include elements similar to printing device 614, but are not depicted in FIG. 6 for purposes of brevity. The approach for implementing locked printing with remote unlock and a common repository is applicable to any number of client devices, mobile devices and printing devices, and the number of these devices may vary depending upon a particular implementation. Arrangement 600 also includes a repository 628 with print data 630 and metadata 632. The various elements depicted in FIG. 6 are communicatively coupled via a network 634. The various elements depicted in FIG. 6 may also be directly communicatively coupled with each other, in addition to, or instead of via network 634. Communications made via network 634 or via direct connections may be made using secure communications protocols, depending upon a particular implementation. For example, communications may be made using any type of encryption, SSL or one or more VPNs.

According to the approach for locked printing with remote unlock using a common repository, when client devices transmit locked print data to printing devices, the printing devices forward the locked print data to a repository where the locked print data is stored. When a user uses a client device, such as a mobile device, to contact a printing device to access print data, the printing device authenticates the user. The printing device then obtains, from the repository, data that identifies the print data that the user is allowed to access. The printing device transmits this data to the user's client device for display. When the user selects particular print data, the printing device retrieves the particular print data from the repository and causes the particular print data to be processed as requested by the user.

Figure 7A:
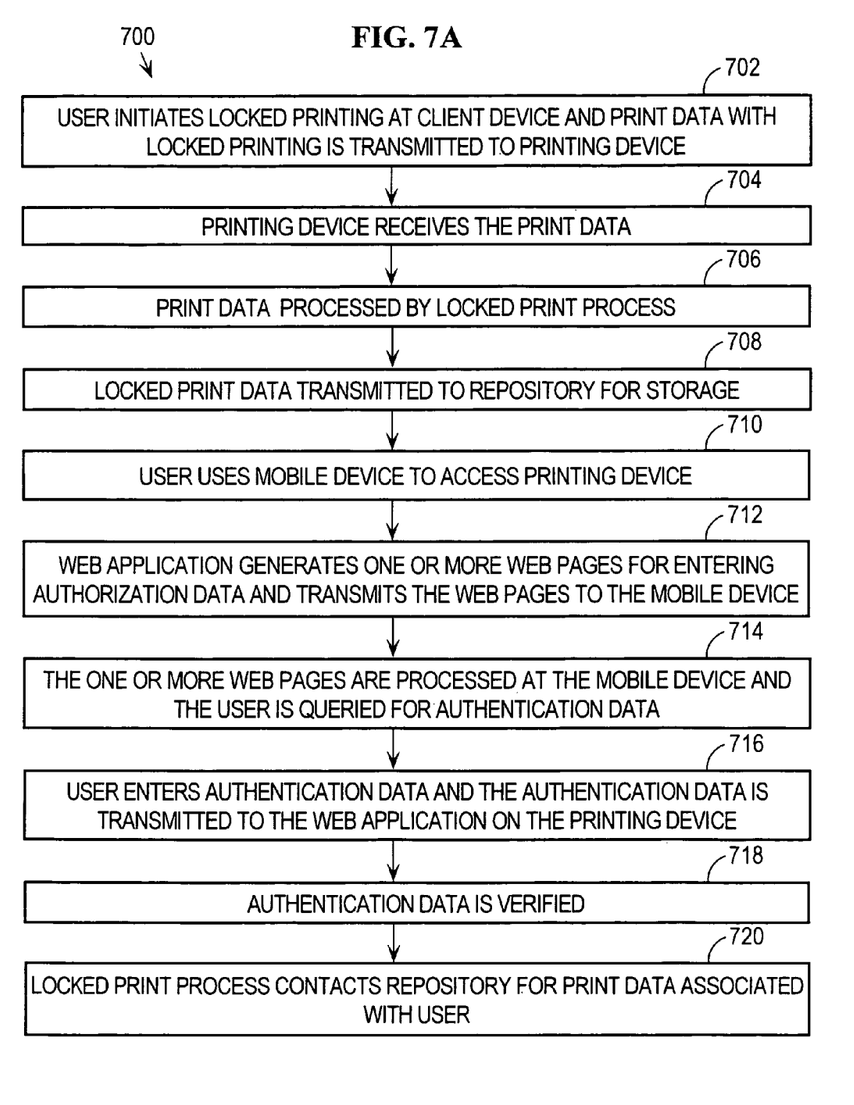
FIGS. 7A and 7B comprise a flow diagram that depicts an approach for implementing locked printing with remote unlock using a common repository, according to one embodiment of the invention.
Figure 7B:
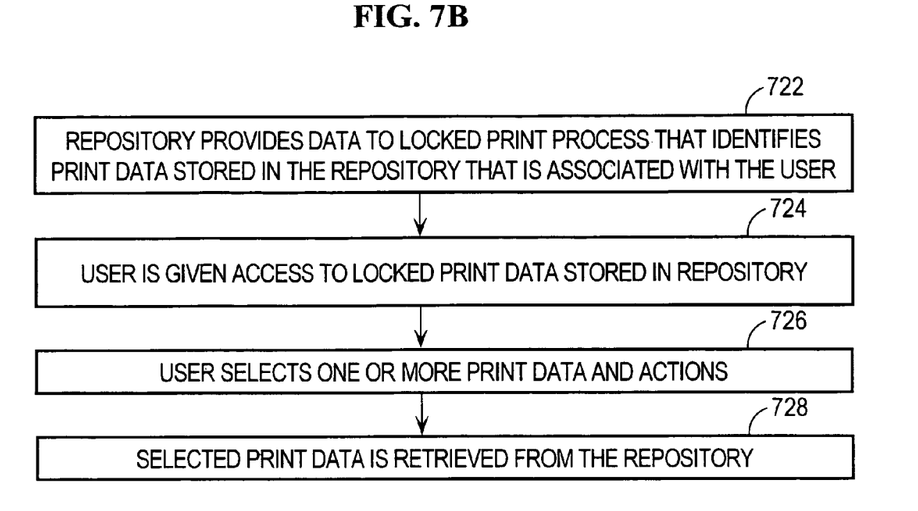

FIGS. 7A and 7B comprise a flow diagram 700 that depicts an approach for implementing locked printing with remote unlock using a common repository, according to one embodiment of the invention. For purposes of explanation, the approach is described in the context of client device 602, mobile device 606 and printing device 614, although the approach may be implemented using any client devices and printing devices.

In step 702, a user initiates locked printing at client device 602 and print data, with locked printing selected, is transmitted to printing device 614 via network 634.

In step 704, printing device 614 receives the print data. In step 706, the print data is processed by locked print process 620. According to one embodiment of the invention, locked print process 620 examines the print data to determine whether locked printing has been specified. If locked printing has been specified, then in step 708, locked print process 620 causes the print data to be transmitted to repository 628 and stored as print data 630. This process may be repeated for any number of print data, from any number of client devices. Each print data that is received and determined to have locked printing specified is transmitted to repository 628 for storage.

Print data 630 stored on repository 628 may be compressed and/or encrypted to save space and to provide additional security.

At some point in time, a user wishes to process print data that was previously sent to a printing device. For example, the user of client device 602 wants to print the print data that was sent to printing device 614. According to one embodiment of the invention, in step 710, the user uses mobile device 606 to access printing device 614, as previously described herein. For example, the user may enter a URL into Web browser 608, which generates and transmits a request to Web application 622 for one or more Web pages related to remote unlock of print data.

In step 712, the Web application 622 generates one or more Web pages for entering authorization data and transmits the one or more Web pages to Web browser 608. In step 714, the one or more Web pages are processed by Web browser 608 and the user is queried for authentication data. In step 716, the user enters authentication data via the graphical user interface generated by Web browser 608 and the authentication data is transmitted to the Web application 622 for authentication. In step 718, the authentication data is verified, as previously described herein.

Once the authentication data has been successfully verified, then in step 720, locked print process 620 contacts repository 628 to request data that identifies the print data 630 stored in repository 628 that is associated with the user. The request may include data, such as user identification data, that identifies the user. The request may have any structure or be in any format. For example, the request may be an XML formatted request. Repository 628 processes the request, for example, by comparing the data contained in the request that identifies the user to the users associated with print data 630. This may include examining the contents of print data 630. Alternatively, metadata 632 may indicate the relationships between users and print data 630. In this situation, metadata 632 may be examined, based upon the data in the request that identifies the user, to determine which print data 630 is associated with the user. In step 722, repository 628 replies to locked print process 620 with data that identifies the print data 630 stored in repository 628 that is associated with the user.

In step 724, the user is given access to locked print data stored on repository 628 that is associated with the user. According to one embodiment of the invention, Web application 622 generates and transmits one or more additional Web pages to Web browser 608. When processed by Web browser 608, the one or more additional Web pages provide a graphical user interface that indicates print data 630 stored in repository 628 that the user is authorized to access. As previously described herein, this may include, for example, a list of print data or groups of print data. In step 726, the user selects for processing, one or more of print data 630 stored in repository 628 that are associated with the user, and one or more actions to be performed on the selected print data. In step 728, printing device 614 retrieves the selected print data 630 from repository 628 and performs the requested action, such as printing the print data 630.

According to another embodiment of the invention, client devices may transmit print data directly to repository 628, bypassing a printing device. For example, when a user generates print data on client device 602 and specifies that locked printing is to be used with the print data, the print data is transmitted from client device 102 to repository 628, without going through a printing device. When a user wishes to later process the print data stored on repository 628, the user uses a client device with a Web browser to contact a printing device, have their authentication data verified and select print data to be processed, as previously described herein. The printing device requests the selected print data from repository 628 and repository 628 provides the selected print data to the printing device.

V. Implementation Mechanisms

Figure 8:
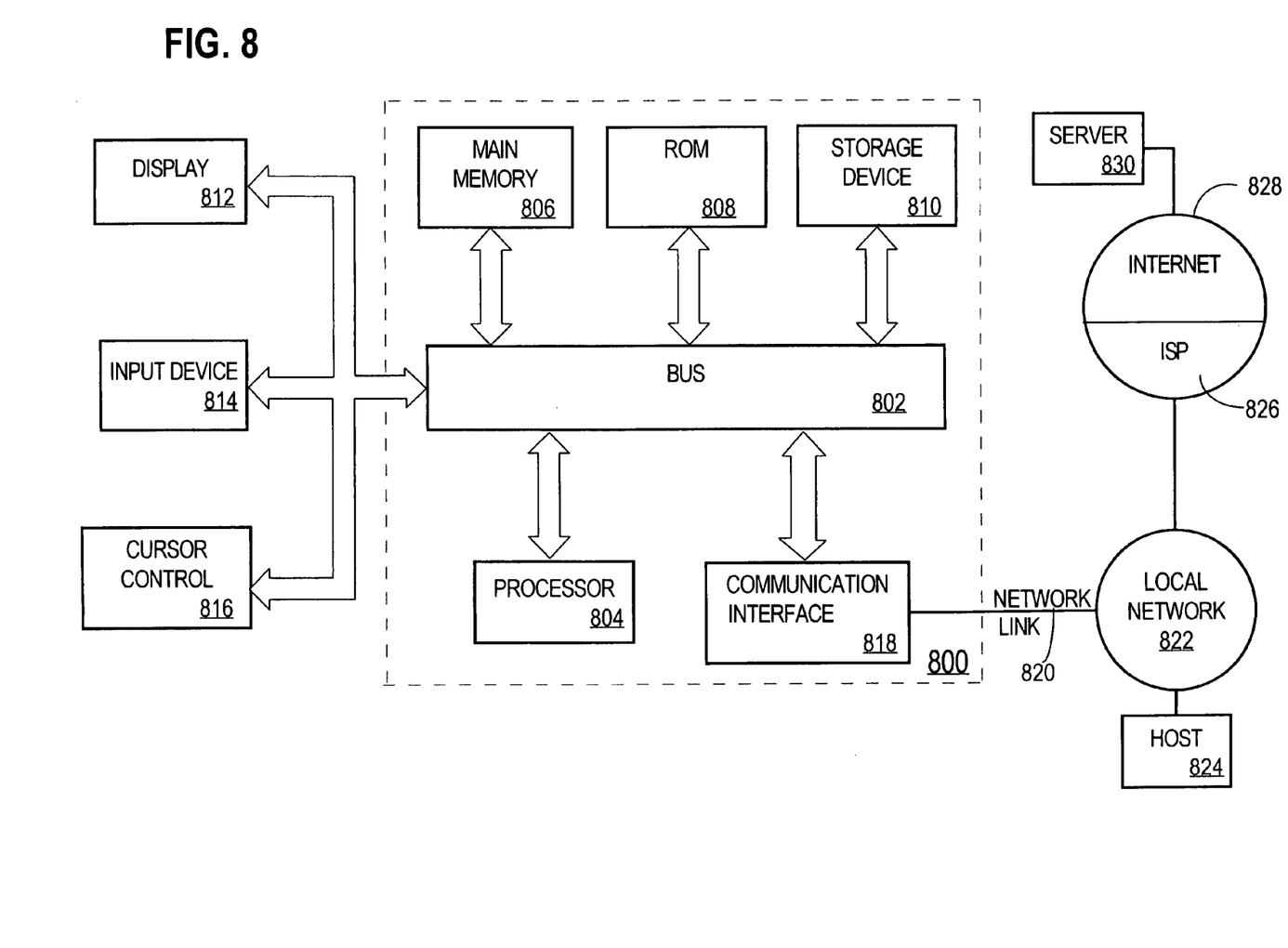
FIG. 8 is a block diagram of a computer system on which embodiments of the invention may be implemented.

The approach described herein for implementing locked printing with remote unlock may be implemented on any type of computing platform or architecture. For purposes of explanation, FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
    a print process configured to process print data and cause the printing device to print a printed version of an electronic document reflected in the print data;
    a Web application configured to:
        generate one or more Web pages and cause the one or more Web pages to be transmitted over a communications network to a Web browser executing on a client device, wherein processing of the one or more Web pages by the Web browser at the client device causes a graphical user interface to be generated that allows a user to enter authorization data which, when successfully verified, allows the user to access print data stored on the printing device, and
        receive, over the communications network from the Web browser executing on the client device, the authorization data entered by the user via the one or more Web pages; and
    a locked print process executing on the printing device and configured to:
        examine print data received by the printing device to determine whether locked printing has been indicated for the print data,
        if locked printing has been indicated for the print data, then cause the print data to be transmitted from the printing device over a second communications network to a repository for storage instead of being printed,
        provide remote unlocking of the print data stored in the repository by verifying the authorization data received by the Web application over the network from the Web browser executing on the client device and if the authorization data is successfully verified, retrieving the print data over the second communications network from the repository and allowing the user access the print data.

2. The printing device as recited in claim 1, wherein the Web application is further configured to generate one or more additional Web pages and cause the one or more additional Web pages to be transmitted to the Web browser executing on the client device, wherein processing of the one or more additional Web pages at the client device causes to be displayed on the graphical user interface both data that indicates one or more print data that the user is authorized to access and one or more user interface objects that correspond to one or more actions that can be performed on the one or more print data.

3. The printing device as recited in claim 1, wherein allowing the user access to the print data includes allowing the print data to be processed and an electronic document reflected in the print data to be printed at the printing device.

4. The printing device as recited in claim 1, wherein allowing the user access to the print data includes allowing the print data to be deleted.

5. The printing device as recited in claim 1, wherein the authorization data is associated with the print data.

6. The printing device as recited in claim 1, wherein the locked print process is further configured to verify the authorization data based upon data stored on the printing device.

7. The printing device as recited in claim 1, wherein the locked print process is further configured to:
   verify the authorization data by causing the authorization data to be transmitted to a verification server over a communications network, and
   receive verification data from the verification server indicating whether the authorization data has been successfully verified.

8. The printing device as recited in claim 1, wherein the client device is a wireless mobile device and the client device and the printing device communicate via a wireless communications link.

9. The printing device as recited in claim 1, wherein the client device is one of a wireless telephony device, a wireless computing device and a personal digital assistant and the client device and the printing device communicate via a wireless communications link.

10. The printing device as recited in claim 1, wherein the client device is a wireless device and the client device and the printing device communicate via a wireless communications link.

11. The printing device as recited in claim 1, wherein:
   the communications network is a first communications network, and
   the second communications network is different than the first communications network.

12. The printing device as recited in claim 1, wherein:
   the locked print process is further configured to:
   if the authorization data is successfully verified and data is received from the client device indicating that the user wishes to process the print data, then cause a request for data to be generated and transmitted over the second communications network to the repository, wherein the request for data requests data that identifies one or more print data that are stored in the repository and associated with the user, and
   receive, from the repository, the data that identifies one or more print data that are stored in the repository and associated with the user; and
   the Web application is further configured to generate one or more additional Web pages and cause the one or more additional Web pages to be transmitted to the Web browser executing on the client device, wherein the one or more additional Web pages reflect the data received from the repository that identifies the one or more print data that are stored in the repository and associated with the user and wherein processing of the one or more additional Web pages at the client device causes to be displayed on the graphical user interface data that identifies the one or more print data that are associated with the user.

* * * * *